United States Patent
Townson et al.

(10) Patent No.: US 8,931,828 B2
(45) Date of Patent: Jan. 13, 2015

(54) GRILL OPENING REINFORCEMENT ASSEMBLY

(71) Applicant: GM Global Technology Operations LLC, Detroit, MI (US)

(72) Inventors: James M. Townson, Clarkston, MI (US); Alexander C. Winter, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/960,431

(22) Filed: Aug. 6, 2013

(65) Prior Publication Data
US 2014/0132034 A1      May 15, 2014

Related U.S. Application Data

(60) Provisional application No. 61/725,025, filed on Nov. 12, 2012.

(51) Int. Cl.
  *B60J 7/00*        (2006.01)
  *B62D 25/08*       (2006.01)
  *B29D 99/00*       (2010.01)

(52) U.S. Cl.
  CPC .......... *B62D 25/084* (2013.01); *B29D 99/0053* (2013.01); *B62D 25/085* (2013.01)
  USPC ........................................ 296/193.1; 293/115

(58) Field of Classification Search
  USPC .............. 296/193.1; 293/115; 180/68.1, 68.2
  See application file for complete search history.

(56) References Cited

U.S. PATENT DOCUMENTS

2007/0182174 A1*   8/2007   Nakayama et al. ........... 293/115

\* cited by examiner

*Primary Examiner* — Joseph D Pape
(74) *Attorney, Agent, or Firm* — Cantor Colburn LLP

(57) ABSTRACT

A grill opening reinforcement (GOR) assembly of a vehicle is provided. The GOR assembly includes a shutter body formed to define a first opening, a front fascia and a seal. The shutter body includes a top portion, first and second side support members and a bottom portion. The front fascia is formed to define a second opening and is supportively attachable to the shutter body. The seal is disposable on a leading edge of at least one of the first and second side support members and the bottom portion and is configured to define an airflow path from the second opening to the first opening.

20 Claims, 5 Drawing Sheets

GRILL OPENING REINFORCEMENT ASSEMBLY

CROSS-REFERENCES TO RELATED APPLICATIONS

This patent application claims priority to U.S. Provisional Patent Application Ser. No. 61/725,025 filed Nov. 12, 2012, which is incorporated herein by reference in its entirety.

FIELD OF THE INVENTION

The subject invention relates to vehicles, and more particularly, to a grill opening reinforcement (GOR) assembly of a vehicle.

BACKGROUND

Vehicles, such as sport utility vehicles (SUVs) and pickup trucks, are assembled by aligning and fastening numerous components and sub-assemblies to one another. One region of the automobile requiring assembly of such components and sub-assemblies is a front end region or "front clip". The front clip is commonly defined as the assembly including the portion of the vehicle extending from the A-pillar (the roof support pillar associated with the front windscreen) to the most forwardly disposed component, which is typically a front bumper. The front clip includes a structural frame, as well as a variety of vehicle components that collectively form the vehicle body.

Several efforts to directly or indirectly mount and/or fix the vehicle body components to each other, as well as to the vehicle frame, have relied on welded support structures or frames and machined body mounting locations for the body components. Approaches relying on such body mounting locations have at times led to large variations in alignment and corresponding issues with the fastening of components to each other. The large variations may influence the aesthetic appearance of the automobile to a user by providing non-uniform or undesirably large or small gaps between components. They may also lead to functional deficiencies, such as undesirable large opening/closing efforts and damage to misaligned components.

The positioning of the front fascia and the grill opening reinforcement assembly along with the ability to create an efficient airflow path from a grill opening to the radiator, vehicle cooling systems and the engine compartment are two areas where precise positioning and alignment are desired. The precise fit of these areas is desired due to their influence on vehicle fit and finish, aesthetic appeal and perceived vehicle quality, as well as their influence on and contribution to airflow over the vehicle and through the grill opening, which in turn affects the aerodynamic drag and drag coefficient of the vehicle and its vehicle fuel efficiency.

For example, an inefficient airflow path and losses of the airflow through the grill and grill opening between the opening and the cooling system may affect the sizing of the grill opening (e.g. require a larger opening) and increase the drag coefficient. Controlling the airflow path can be particularly complicated when front fascias are employed, since they generally include many complex curved surfaces that affect efforts to define an efficient airflow path. This has generally been accomplished using various combinations of airflow closeouts and masticated rubber baffles which are incorporated into, and accurately positioned within, the front end clip. While these structures can be effective in defining the air flow path, they add to cost and afford the opportunity for positional variability, which can affect variability in the efficiency of the airflow path and vehicle performance.

Accordingly, it is desirable to provide improved support and positioning of the front fascia, to improve the efficiency of the airflow path and to reduce airflow losses through the grill opening to improve vehicle fit, finish and performance.

SUMMARY OF THE INVENTION

In one exemplary embodiment, a grill opening reinforcement (GOR) assembly of a vehicle is provided. The GOR assembly includes a shutter body formed to define a first opening, a front fascia and a seal. The shutter body includes a top portion, first and second side support members and a bottom portion. The front fascia is formed to define a second opening and is supportively attachable to the shutter body. The seal is disposable on a leading edge of at least one of the first and second side support members and the bottom portion and is configured to define an airflow path from the second opening to the first opening.

In another exemplary embodiment, a vehicle front end is provided and includes a heat generating element, a shutter body, a front fascia and a seal. The shutter body is formed to define a first opening corresponding in size, shape and location to the heat generating element and includes a top portion, first and second side support members and a bottom portion. The front fascia is formed to define a second opening and is supportively attachable to the shutter body. The seal is disposable on a leading edge of at least one of the first and second side support members and the bottom portion and is configured to define an airflow path from the second opening to the first opening and toward the heat generating element.

In yet another exemplary embodiment, a method of manufacturing a grill opening reinforcement (GOR) assembly of a vehicle is provided and includes forming a shutter body defining a first opening and comprising a top portion, first and second side support members and a bottom portion, forming a front fascia defining a second opening and configured to be supportively attached to the shutter body and disposing a seal on a leading edge of at least one of the first and second side support members and the bottom portion such that the seal is configured to define an airflow path from the second opening to the first opening.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
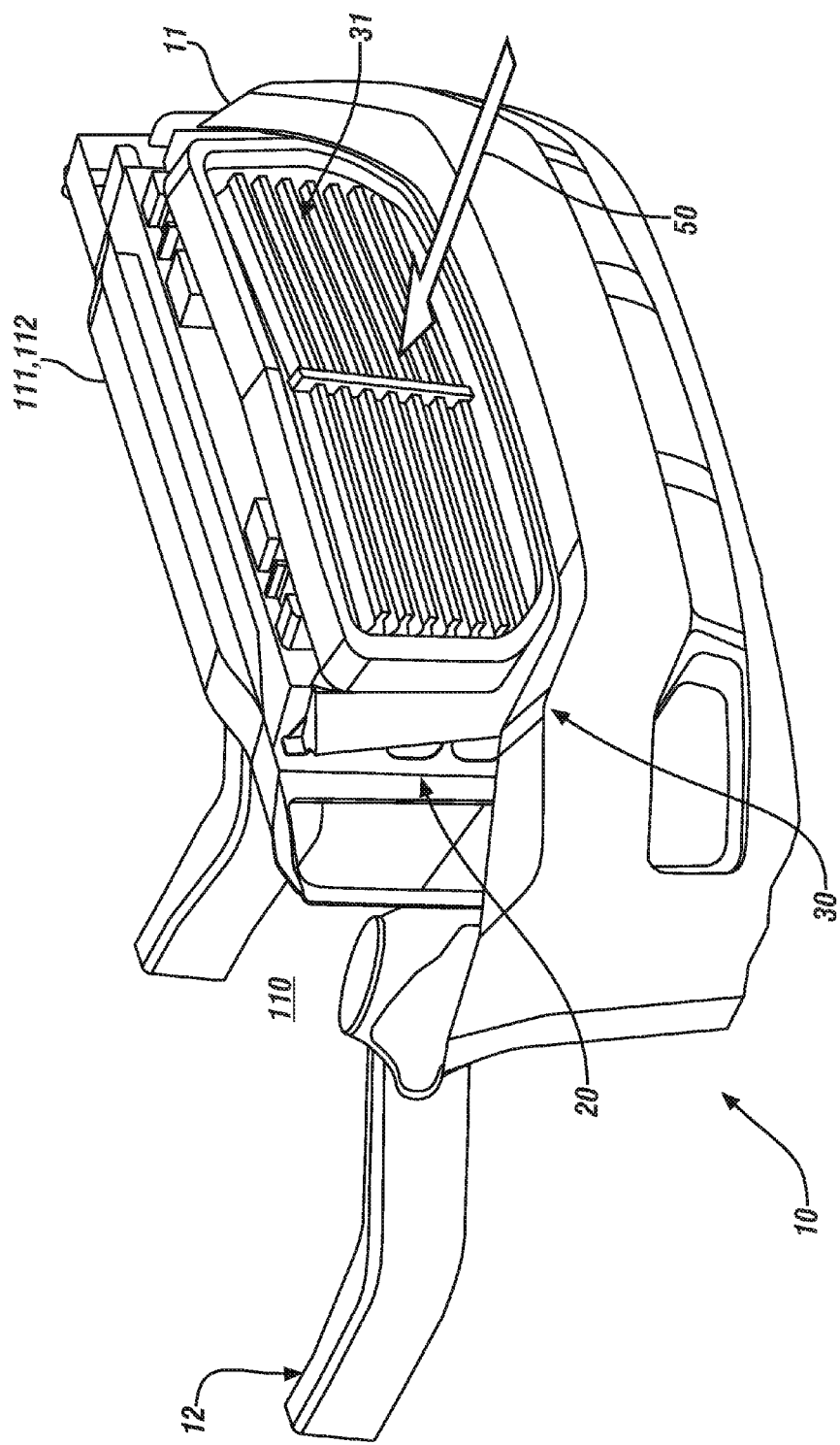
FIG. 1 is a perspective view of an exemplary embodiment of a vehicle front end.

The following description is merely exemplary in nature and is not intended to limit the present disclosure, its application or uses. It should be understood that throughout the drawings, corresponding reference numerals indicate like or corresponding parts and features.

Figure 2:
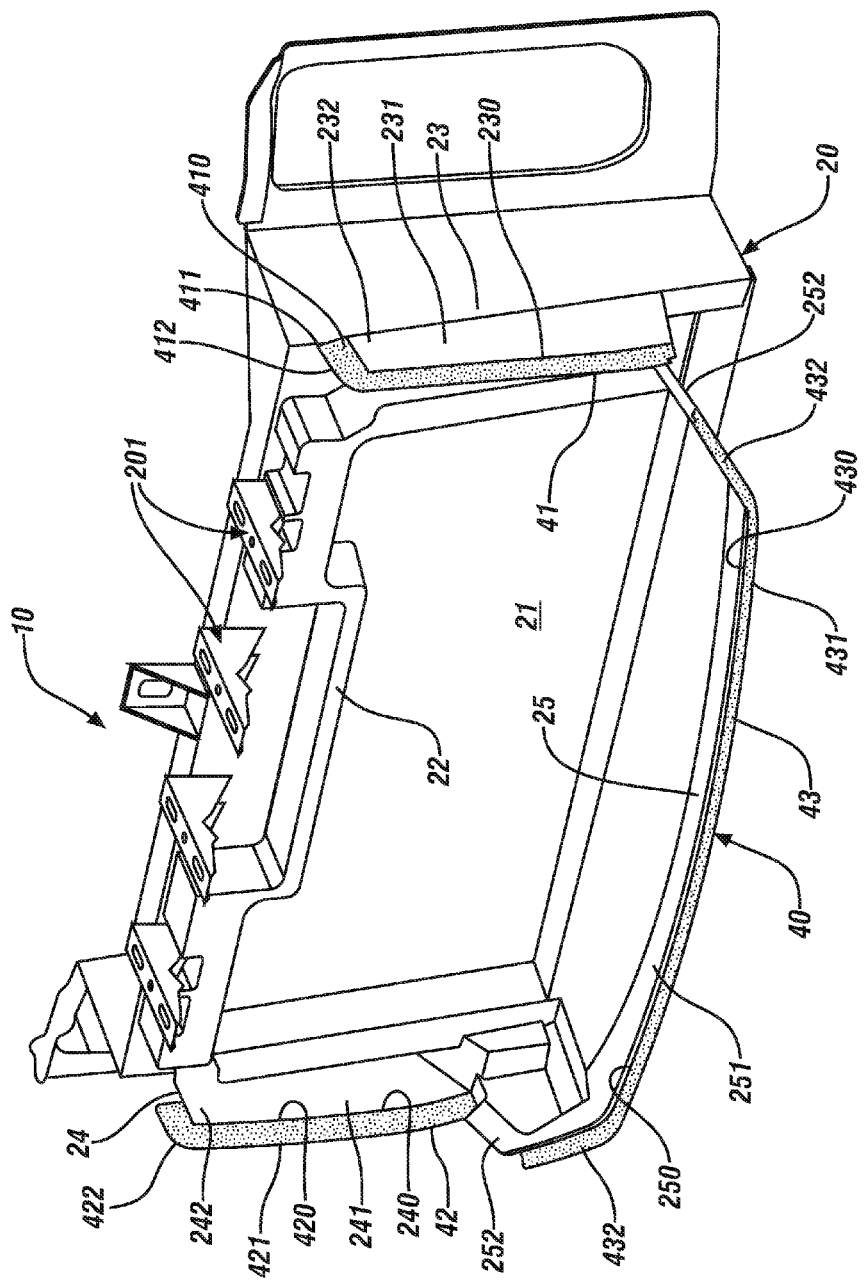
FIG. 2 is a perspective view of a shutter body and a seal disposed on the shutter body in accordance with embodiments.
Figure 3:
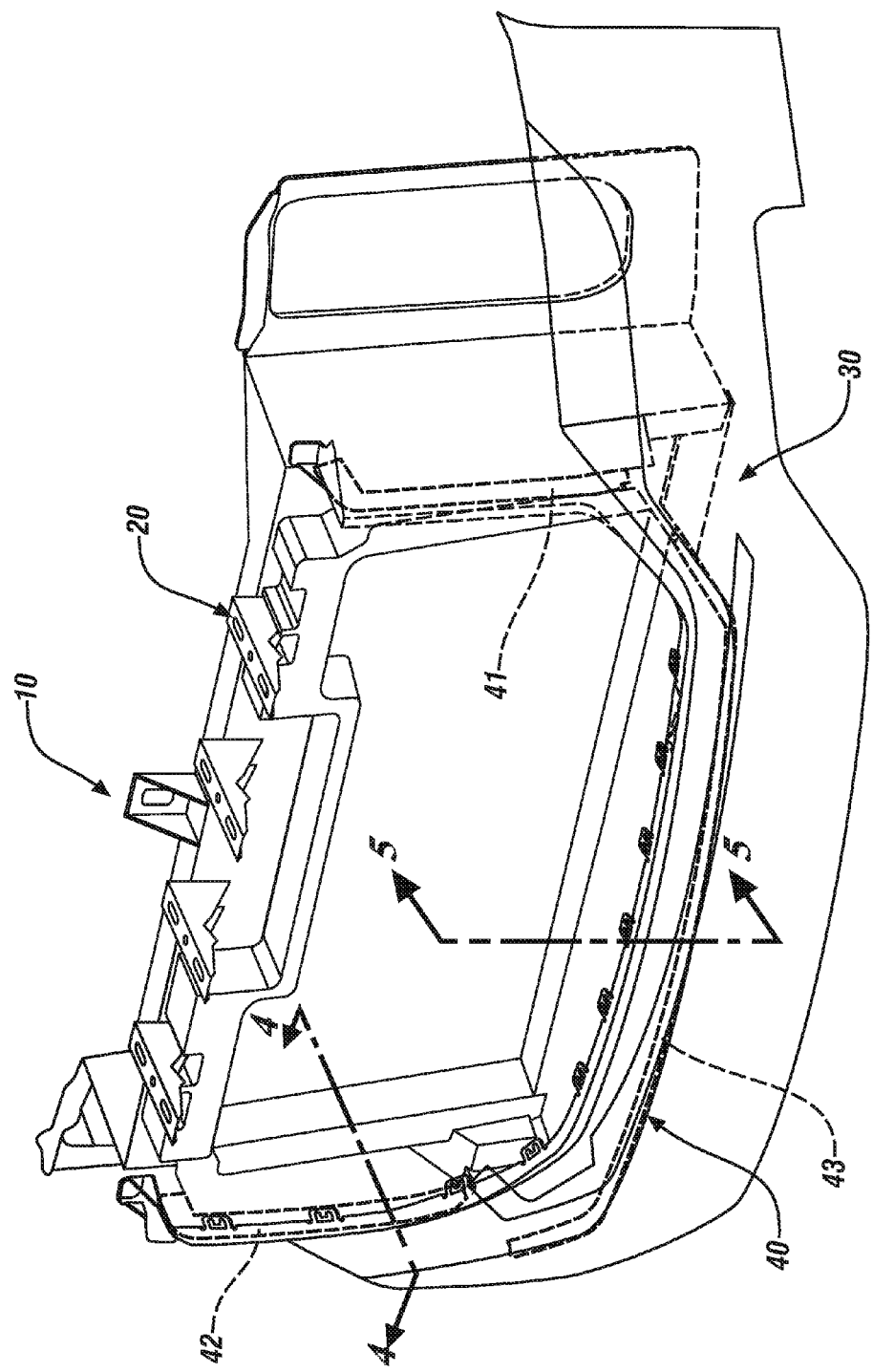
FIG. 3 is a perspective view of a front fascia supportively attached to the shutter body of FIG. 2 in accordance with embodiments.

With reference to FIGS. 1-3, a grill opening reinforcement (GOR) assembly 10 is provided for use in, for example, a front end 11 of a vehicle 12. As shown in FIG. 1, the front end 11 includes an engine compartment 110, which is sized to fit a heat generating element 111 such as an engine and/or a radiator 112. The GOR assembly 10 includes a shutter body 20, a front fascia 30 supportively attachable to the shutter body 20 and a seal 40 that is integrally formed with or onto at least one or more leading edges of the shutter body 20 as will be discussed below. The shutter body 20 is synonymous with the term "front fascia support structure" and is formed to define a first opening 21 (see FIG. 2) that generally corresponds in size, shape and location to the heat generating element 111.

The shutter body 20 is attachable to the front end 11 of the vehicle 12 by way of positioning and attachment features 201 and corresponding features of the front end 11. The positioning and attachment features 201 enable precise and repeatable positioning of the shutter body 20 and provide a desirable vehicle fit and finish, aesthetic appeal and perceived vehicle quality. The shutter body 20 includes a top portion 22, a first side support member 23 that extends in a first direction from an end of the top portion 22, a second side support member 24 that extends in the first direction from an opposite end of the top portion 22 and a bottom portion 25 that extends between distal ends of the first side support member 23 and the second side support member 24. The front fascia 30 is configured to assume a stylistic appearance for the vehicle 12 and is formed to define a second opening 31 (i.e., a grill opening, see FIG. 1), which may also correspond in size shape and location to the heat generating element 111.

The first side support member 23 includes a leading edge 230 defined by a baffle 231, the second side support member 24 includes a leading edge 240 defined by a baffle 241 and the bottom portion 25 includes a leading edge 250 defined by a baffle 251. The baffles 231, 241 and 251 cooperatively and partially enclose the region between the first opening 21 and the second opening 31. The seal 40 is disposable on at least one or more of the leading edges 230, 240 and 250 and, in accordance with further embodiments, the seal 40 is disposable as a plurality of seal elements on each of the leading edges 230, 240 and 250. More particularly, the seal 40 is disposable on at least one or more of the respective leading edges of the baffles 231, 241 and 251 and, in accordance with further embodiments, the seal 40 is disposable as a plurality of seal elements on each of the respective leading edges of the baffles 231, 241 and 251.

As will be discussed below, the seal 40 is formed of a relatively hard polymer substrate over-molded with a softer polymer. As discussed in further detail below in reference to FIG. 7, the seal 40 is formed using a dual-shot injection molding technology to facilitate a fluid seal around a perimeter of the first opening 21. The fluid seal facilitated by seal 40 blocks, for example, airflow leakage from between the shutter body 20 and the front fascia 30 and is configured to define an airflow path 50 (see FIG. 1). The airflow path 50 extends transversely relative to the first direction from the second opening 31 to the first opening 21 and toward the heat generating element 111. The definition of the airflow path 50 by the seal 40 improves airflow over exterior surfaces of the vehicle and through the first and second openings 21, 31 with minimal losses, which in turn reduces the aerodynamic drag and drag coefficient of the vehicle and increases the vehicle fuel efficiency.

As shown in FIGS. 2 and 3, the seal 40 may be provided as a plurality of individual seal elements 41, 42 and 43. Individual seal element 41 is associated with the first side support member 23 and includes a constrained end 410 that is connected to the first side support member 23 and a free end 411 opposite the constrained end 410. The individual seal element 41 may have a curvature along the first direction that is similar to a curvature of the first side support member 23. In addition, the individual seal element 41 may include a flange 412 that extends around a shoulder portion 232 of the first side support member 23. Individual seal element 42 is associated with the second side support member 24 and includes a constrained end 420 that is connected to the second side support member 24 and a free end 421 opposite the constrained end 420. The individual seal element 42 may have a curvature along the first direction that is similar to a curvature of the second side support member 24. In addition, the individual seal element 42 may include a flange 422 that extends around a shoulder portion 242 of the second side support member 24. Individual seal element 43 is associated with the bottom portion 25 and includes a constrained end 430 that is connected to the bottom portion 25 and a free end 431 opposite the constrained end 430. The individual seal element 43 may have a curvature along a direction transverse to the first direction and the direction of the airflow path 50 that is similar to a curvature of the bottom portion 25. In addition, the individual seal element 43 may include wings 432 that extend along outer wing portions 252 of the bottom portion 25. In accordance with embodiments, the outside edges of the wings 432 may be aligned or nearly aligned with the respective proximal ends of the individual seal elements 41 and 42.

As noted above, the shutter body 20 includes an integrally molded first polymer 26 (see FIG. 7) and the seal 40 includes an integrally co-molded second polymer 44 (see FIG. 7), such as rubber, a rubberized material, an elastomer 440 (see FIG. 7) or another similarly compliant material. In accordance with embodiments, the integrally co-molded second polymer 44 may have a hardness that is less than a hardness of the integrally co-molded first polymer 26.

Figure 4:
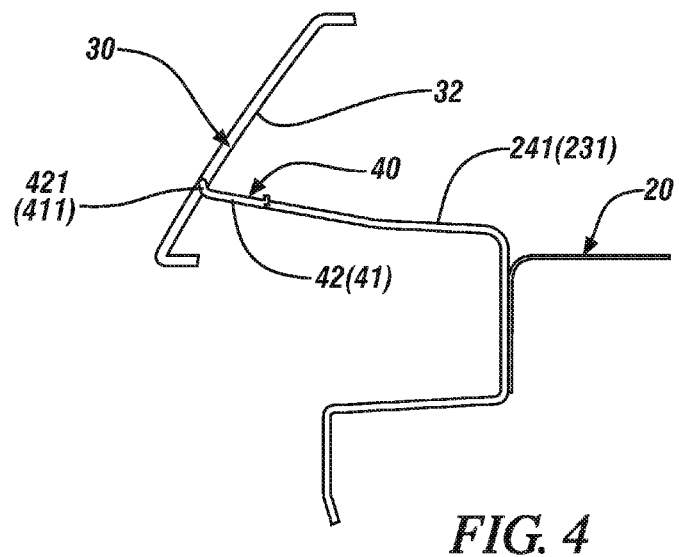
FIG. 4 is a cross-sectional view taken along line 4-4 of FIG. 3.
Figure 5:
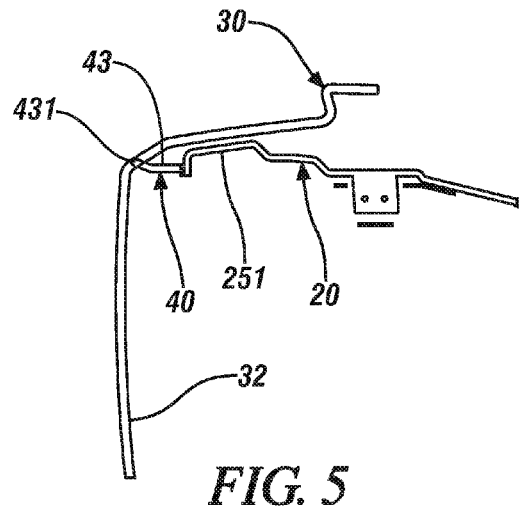
FIG. 5 is a cross-sectional view taken along line 5-5 of FIG. 3.

With reference to FIGS. 4 and 5, when the front fascia 30 is supportively attached to the shutter body 20, the seal 40 forms an interference coupling with a rear surface 32 of the front fascia 30. As shown in FIGS. 4 and 5, this interference coupling is defined by a bending of the free ends 411, 421 and 431 of the individual seal elements 41, 42 and 43 against the rear surface 32 upon assembly and provides for a pressed engagement of the individual seal elements 41, 42 and 43 to the front fascia 30. With this configuration, the interference coupling between the seal 40 and the rear surface 32 eliminates or substantially reduces a need for discrete adapters and baffles.

Figure 6:
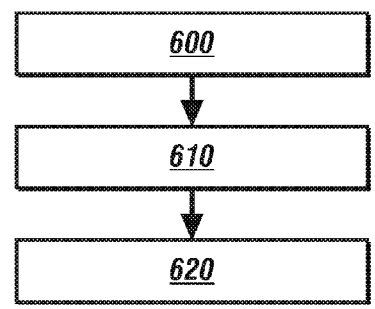
FIG. 6 is a flow diagram illustrating a method of manufacturing a grill opening reinforcement assembly of a vehicle in accordance with embodiments.
Figure 7:
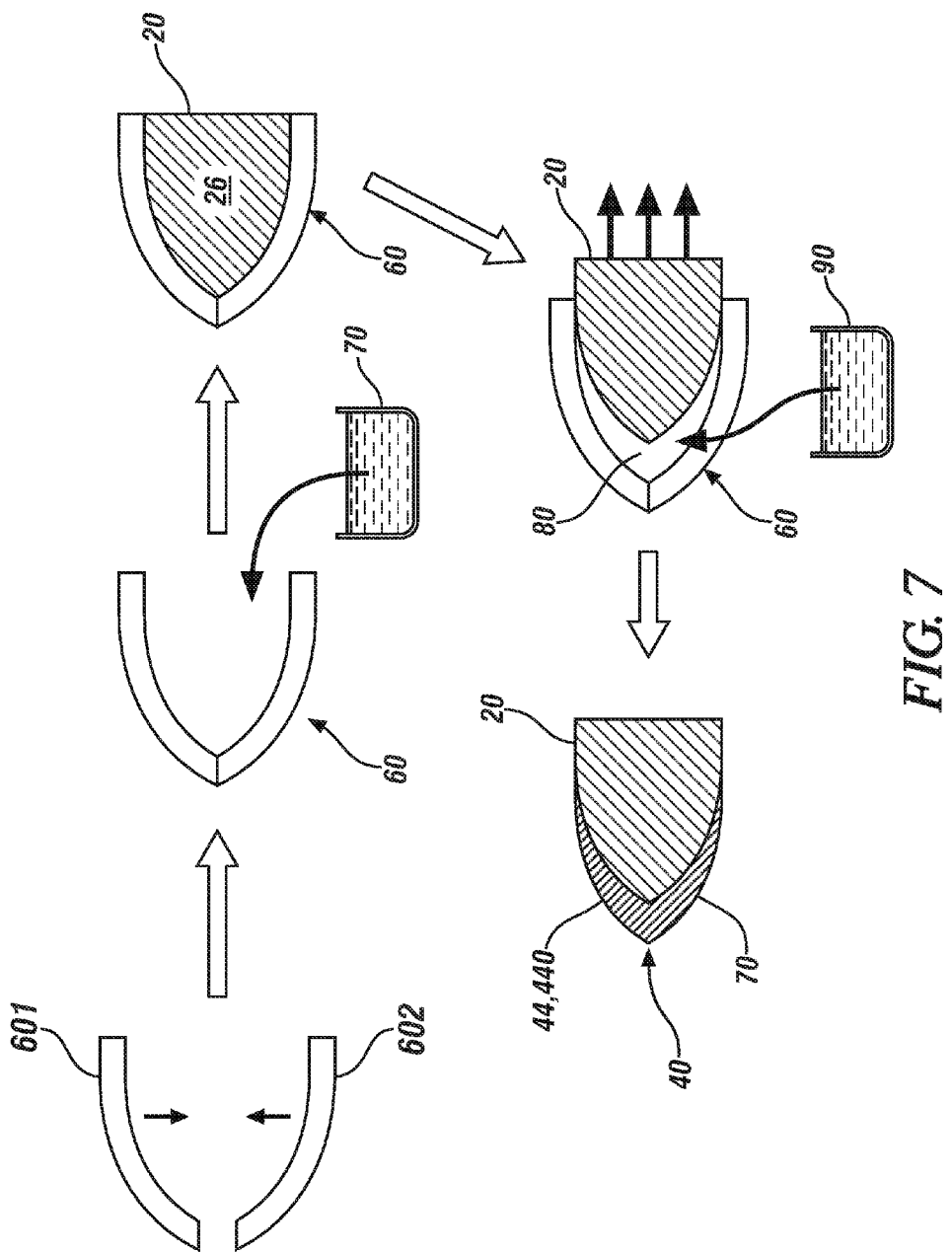
FIG. 7 is a diagram illustrating a method of seal disposition in accordance with embodiments.

In accordance with further embodiments and, with reference to FIGS. 6 and 7, a method of manufacturing the GOR assembly 10 described above is provided. As shown in FIG. 6, the method includes forming the shutter body 20 defining the first opening 21 and including the top portion 22, the first side support member 23, the second side support member 24 and the bottom portion 25 (operation 600), forming the front fascia 30 defining the second opening 31 and being supportively attachable to the shutter body (operation 610) and disposing the seal 40 on at least one of the leading edges 230, 240, 250 such that the seal 40 is configured to define the airflow path 50 from the second opening 31 to the first opening 21 (operation 620).

In accordance with embodiments, the disposing of the seal 40 may include dual shot over-molding of the seal 40 onto the at least one of the leading edges 230, 240, 250. More particularly, as shown in FIG. 7, the forming of the shutter body 20 includes assembling a mold 60 from mold components 601, 602, injecting a shutter body material 70 into the mold 60 and allowing the shutter body material 70 to cure to form the shutter body 20. The disposing of the seal 40 includes partially withdrawing the shutter body 20 from the mold 60 to create space 80 between the shutter body 20 and the mold 60. A seal material 90 is then injected into the space 80 between the shutter body 20 and the mold 60 and is allowed to cure to form the seal 40. As noted above, the shutter body material 70 may include the integrally molded first polymer 26 and the seal material 90 may include the integrally co-molded second polymer 44, which is softer than the first polymer.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A grill opening reinforcement (GOR) assembly of a vehicle, the GOR assembly comprising:
   a shutter body formed to define a first opening and comprising a top portion, first and second side support members and a bottom portion;
   a front fascia formed to define a second opening and being supportively attachable to the shutter body; and
   a seal disposable on a leading edge of at least one of the first and second side support members and the bottom portion and being configured to define an airflow path from the second opening to the first opening.

2. The GOR assembly according to claim 1, wherein the seal is disposed on the respective leading edges of the first and second side support members and the bottom portion.

3. The GOR assembly according to claim 2, wherein the seal is disposable on first and second side baffles and a bottom baffle of the respective leading edges of the first and second side support members and the bottom portion.

4. The GOR assembly according to claim 1, wherein the shutter body comprises an integrally molded first polymer.

5. The GOR assembly according to claim 4, wherein the seal comprises an integrally co-molded second polymer.

6. The GOR assembly according to claim 5, wherein the integrally co-molded second polymer has a hardness that is less than a hardness of the integrally co-molded first polymer.

7. The GOR assembly according to claim 5, wherein the integrally co-molded second polymer comprises an elastomer.

8. A vehicle front end, comprising:
   a heat generating element;
   a shutter body formed to define a first opening substantially corresponding in size, shape and location to the heat generating element and comprising a top portion, first and second side support members and a bottom portion;
   a front fascia formed to define a second opening and being supportively attachable to the shutter body; and
   a seal disposable on a leading edge of at least one of the first and second side support members and the bottom portion and being configured to define an airflow path from the second opening to the first opening and toward the heat generating element.

9. The vehicle front end according to claim 8, wherein the heat generating element is disposed in an engine compartment.

10. The vehicle front end according to claim 8, wherein the heat generating element comprises a radiator.

11. The vehicle front end according to claim 8, wherein the seal is disposed on the respective leading edges of the first and second side support members and the bottom portion.

12. The vehicle front end according to claim 11, wherein the seal is disposable on first and second side baffles and a bottom baffle of the respective leading edges of the first and second side support members and the bottom portion.

13. The vehicle front end according to claim 8, wherein the shutter body comprises an integrally molded first polymer.

14. The vehicle front end according to claim 13, wherein the seal comprises an integrally co-molded second polymer.

15. The vehicle front end according to claim 14, wherein the integrally co-molded second polymer has a hardness that is less than a hardness of the integrally co-molded first polymer.

16. The vehicle front end according to claim 14, wherein the integrally co-molded second polymer comprises an elastomer.

17. A method of manufacturing a grill opening reinforcement assembly of a vehicle, the method comprising:
   forming a shutter body defining a first opening and comprising a top portion, first and second side support members and a bottom portion;
   forming a front fascia defining a second opening and configured to be supportively attached to the shutter body; and
   disposing a seal on a leading edge of at least one of the first and second side support members and the bottom portion such that the seal is configured to define an airflow path from the second opening to the first opening.

18. The method according to claim 17, wherein the disposing comprises dual shot over-molding of the seal onto the at least one of the leading edges.

19. The method according to claim 17, wherein the forming of the shutter body comprises injecting a shutter body material into a mold and allowing the shutter body material to cure in the mold to form the shutter body and the disposing of the seal comprises:
   partially withdrawing the shutter body from the mold to creating a space between the mold and the shutter body; and
   injecting a seal material into the space and allowing the seal material to cure in the second space such that the cured seal material is coupled to the shutter body.

20. The method according to claim 19, wherein the shutter body material comprises a first polymer and the seal material comprises a second polymer, which is softer than the first polymer.

* * * * *